United States Patent Office 3,423,348
Patented Jan. 21, 1969

3,423,348
WEATHER RESISTANT RUBBERY COMPOSITION
Edmund Gerald Eigenfeld, Coventry Township, Summit County, and Karl Stuart Vogel, Akron, Ohio, assignors to The Firestone Tire & Rubber Company, Akron, Ohio, a corporation of Ohio
Filed Sept. 1, 1965, Ser. No. 484,183
U.S. Cl. 260—28.5                     12 Claims
Int. Cl. C08d 9/00; C08c 11/70

ABSTRACT OF THE DISCLOSURE

This invention relates to the protection of vulcanizable rubber compounds with a unique petroleum wax material of the paraffin type. This specific petroleum paraffin wax has a refractive index between 1.423 and 1.429 and a broad carbon atom distribution thereby giving protection to the rubber article over a wide range of ambient temperatures.

---

Figure 1:
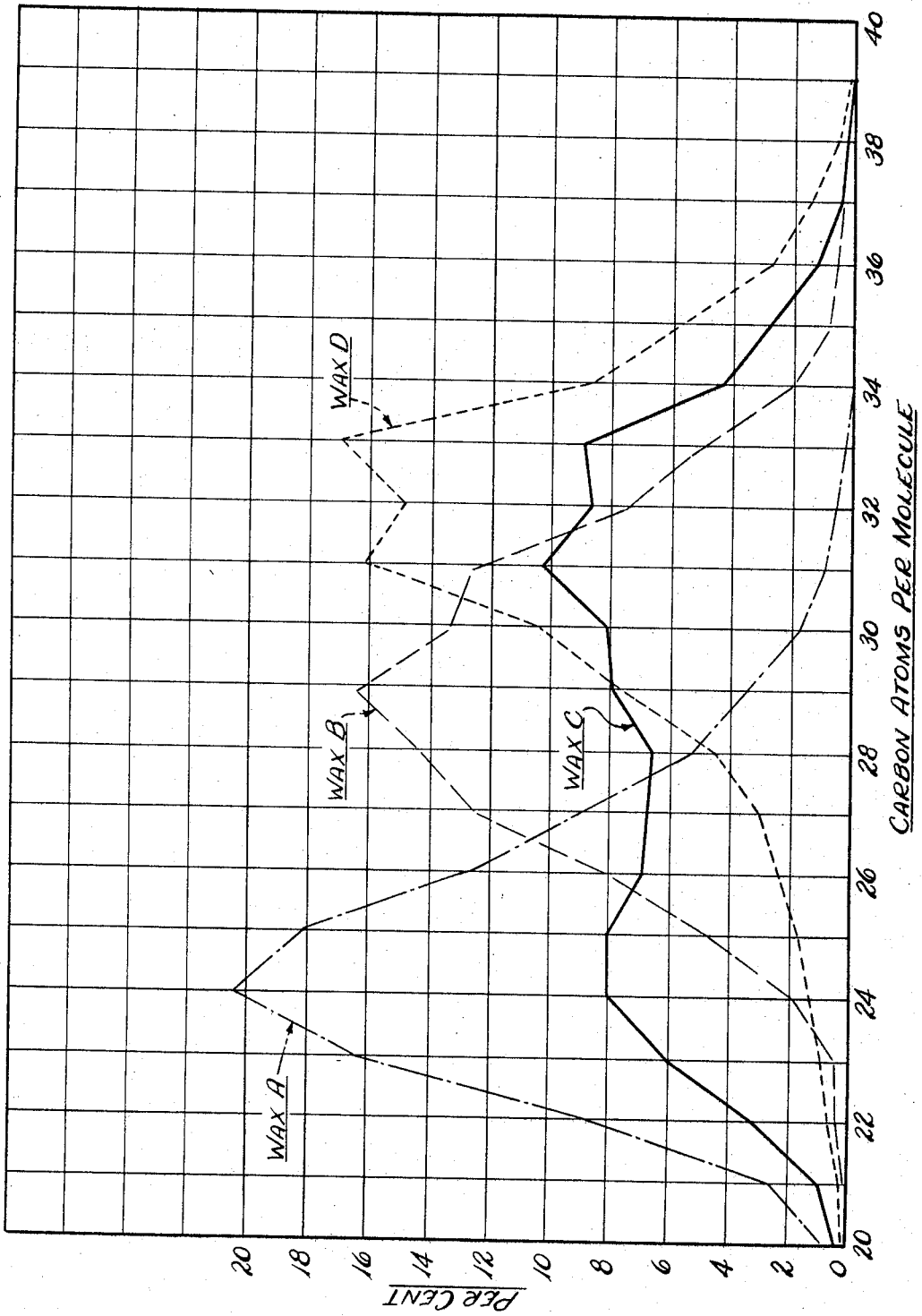

The present invention relates to waxes and more particularly to the use of waxes in rubbery vulcanizates to increase their resistance to degradation upon prolonged exposure; that is, to sunlight and the atmosphere.

It has long been known that exposure to sunlight and atmosphere causes rubbery vulcanizates to crack or check, thereby causing an unsightly appearance or eventually, with prolonged exposure, actual failure. It is known ozone will attack the unsaturated double bonds in rubbery vulcanizates and thereby cause a break in the chain, termed "chain scission." The rate of this attack may be greatly increased by putting the rubber under stress by expansion. It has also long been known and been the practice to add weathering inhibitors to rubber to combat this degradation. These additives may be classified in two classes: (1) antiozonants, and (2) waxes. Both of these materials may be added to the rubber compound while it is being mixed in the conventional methods; that is, in a Banbury mixer or on a mill. The antiozonants are chemicals which react with the atmospheric ozone to break it down, thereby negating its effect on rubber; examples of these are the p-phenylenediamines and quinolines. The waxes are slightly soluble in rubber and if added in excess of their solubility will migrate to and "bloom" on the surface of the rubber creating a protective film through which the atmosphere cannot pass.

The materials of the first class protect the rubber both statically and dynamically, whereas the materials of the second class provide only static protection. This static protection usually is nullified upon flexing as the film will crack or even flake off causing a vulnerable point of attack for the atmosphere. Both of these classes are effective by themselves but in practice these classes are generally used in combination due to what is felt to be the synergistic effect obtained.

The present invention relates to the second class. Waxes have been used to protect rubber from static checking for several years, for example, see U.S. 2,561,671; U.S. 2,013,319; U.S. 1,985,261; U.S. 2,559,398 and U.S. 2,662,-864. In order for a wax to be effective it must form a film on the rubber surface by its action of "blooming" on the rubber surface. However, their effectiveness is limited to a certain climatical region due to the effect of ambient temperature on their rate of bloom. In the past, it has been the practice to use lower melting point waxes for cooler regions and higher melting point waxes for warmer regions using the theory the lower the melting point the lower the temperature at which it will bloom. However, due to the increased mobility of transportational articles (tire specifically) in recent years, one can't be assured that a product designed for optimum protection in a warm climate will be used solely, if at all, in the warm climate. Therefore, a need for a universal wax has developed within recent years; that is, a wax that will given adequate protection over a wide range of ambient temperatures. It is an objective of this invention to provide a wax of this type.

In the past the only reliable method of evaluating a wax as to the ambient temperature range in which it would adequately protect a rubber vulcanizate was a costly and time consuming field test in which many protected articles were compared with the standard articles and changes noted. It is another objective of this invention to provide a method for predicting the protective power of a wax without these field tests.

In the past, two basic methods of increasing the range of the static protection in a rubber vulcanizate were employed. The first was to merely increase the amount of wax used. The disadvantages to this were a corresponding decrease in physical properties of the compound due to the diluent effect of the wax filler, and an increase in the unsightly appearance of the article due to the increased bloom on the surface. This unsightly appearance is especially noted with the lower melting point waxes (135° F. and below). It is another objective of this invention to provide a wax that will give adequate protection over a wide range of ambient temperature using a minimum amount of wax that is acceptable from an appearance standpoint. It is noted that the addition of materials whose effect is to mitigate this appearance effect, such as a microcrystalline wax, in one way alters the theory or effect of the wax of this invention.

By the second method one would merely blend waxes of various melting points thereby theoretically increasing the range of temperature over which different phases of the wax would "bloom." When using this melting point method all of the waxes employed would be of a very narrow cut (a very narrow carbon atom distribution). It is the present practice to use only waxes of narrow cuts in rubber articles because this gives the most accurate melting point. The disadvantage of this is the inability to determine the actual effectiveness of the wax by its melting point.

The inventors found that this previously employed standard melting point test was not a reliable method to determine the actual effectiveness of a wax and give a true indication of the protective range of the wax. This is due to the difficulty of determining the melting point, due to the amorphous character of the wax, and the actual insignificance of the melting point, because it is a mere average reading, not indicating the true nature of the wax.

After many failures using the old trial and error melting point method, the inventors abandoned it and devised a method of determining what wax would have optimum effectiveness in each temperature range completely disregarding the old melting point test. The inventors did this by defining the wax by its carbon atom distribution as measured by a gas chromatograph and refractive index; not its melting point. They found that this method gave a much better correlation with actual protection at different temperatures. They also found that by this method one could accurately predict where, and where not, a wax would offer protection. As shown in FIGURE I (waxes B and C have the same melting point—Table I) waxes may have the same melting point but widely different carbon atom distribution. With the present experience the inventors are able to predict in what ranges a wax will protect, and in what it will not, without any time consuming field tests.

It is the inventors' contention that the carbon atom distribution gives the best indication of the protective power and range of a wax, provided the structure of the wax is substantially straight chain or N-paraffin, as opposed to cyclic or branched chains. The refractive index is used to control the structure to the desired straight chain eliminating the use of cyclic or branched structures.

It is well known that a wax offers static protection by "blooming" or forming a film on the surface of the article through which the atmosphere can't penetrate. The inventors contend this film is a function of three factors; ambient temperature, mobility of wax in rubber, and solubility of wax in rubber (see FIGURE II). Wax is soluble in rubber to a certain extent, say one percent. The remainder of the wax is suspended in the rubber so there are two phases present; rubber-wax and wax. As the ambient temperature raises, the suspended wax phase becomes more mobile, and, therefore, its probability of coming to the surface is increased, and the correspondingly caused bloom at the surface is increased. This mobility and bloom continues to increase with increasing ambient temperature. However, also increasing with the ambient temperature is the solubility of the wax in rubber. But this mobility increases at a faster rate than the solubility until a certain critical temperature is reached at which the solubility takes over and thusly the wax film is decreased.

It is the inventors' contention that the mobility and solubility of a wax phase are directly proportional to its carbon atom chain length. That is, the lower the carbon chain length, the more mobile and the more soluble a wax and conversely, the higher the carbon chain, the less mobile and less soluble a wax at a constant temperature. This all assumes the structure of the wax is substantially N-paraffin, not cyclic or branched; this is controlled by the refractive index limits.

To protect over a wide range of temperatures, a broad range of carbon atom chains must be present with the lower carbon atom chains being mobile at the lower temperature and offering protection by blooming while the progressively higher carbon atom chains, having not reached their critical temperature until higher ambient temperature, will offer protection in their range. With a broad range of carbon atom chains, protection may be obtained over a broad range of temperatures. Again note waxes B and C of FIGURE I (the figure will be explained later) which have the same melting point (see Table I) but radically different carbon atom distribution.

By employing this method, the inventors have developed a wax which offers adequate protection over a wide range of ambient temperatures which was not known before. Data which shows this is set forth in Table I where the wax of this invention is compared to prior waxes in varied ambient conditions.

Referring to Table I, the wax of this invention and representative waxes of prior use each compounded into a standard rubber compound, the only difference in the compounds being the wax so included. The wax was compounded at a level of 6.5 parts of wax per 100 parts of rubber hydrocarbon in the rubber compound. These compounds were then cured and statically exposed to 50–60 p.p.h.m. of ozone for 24 hours in a standard weatherometer under various ambient temperatures, 30° F., 80° F., and 100° F., which encompasses the range in which a rubber article normally performs. This test clearly shows the superiority of the wax of this invention in protecting a rubber compound from ozone attack over a wide range of temperature. Wax A is the prior cold climate wax, and Wax B and D are prior warm climate waxes, and Wax C is the wax of this invention. The melting point determinations are also included in Table I giving a clear example that melting point is not the proper determination to evaluate performance. See Waxes B and C which could not be differentiated from one another by the melting point test but obviously give radically different performance as seen in Table I.

FIGURE I is the graphic representation of the waxes of Table I showing their respective carbon atom distributions. The difference between waxes B and C is apparent— wax B has a narrow carbon atom distribution, therefore, protecting only over a narrow range, whereas, wax C has a broad carbon atom distribution giving protection over a wide range. This figure also shows the narrow carbon atom distribution of the prior use waxes and that their protective power is directly related to their carbon atom distribution; that is, the low carbon atom chains protecting at low ambient temperatures and the large carbon atom chains protecting at high ambient temperatures.

Figure 3:
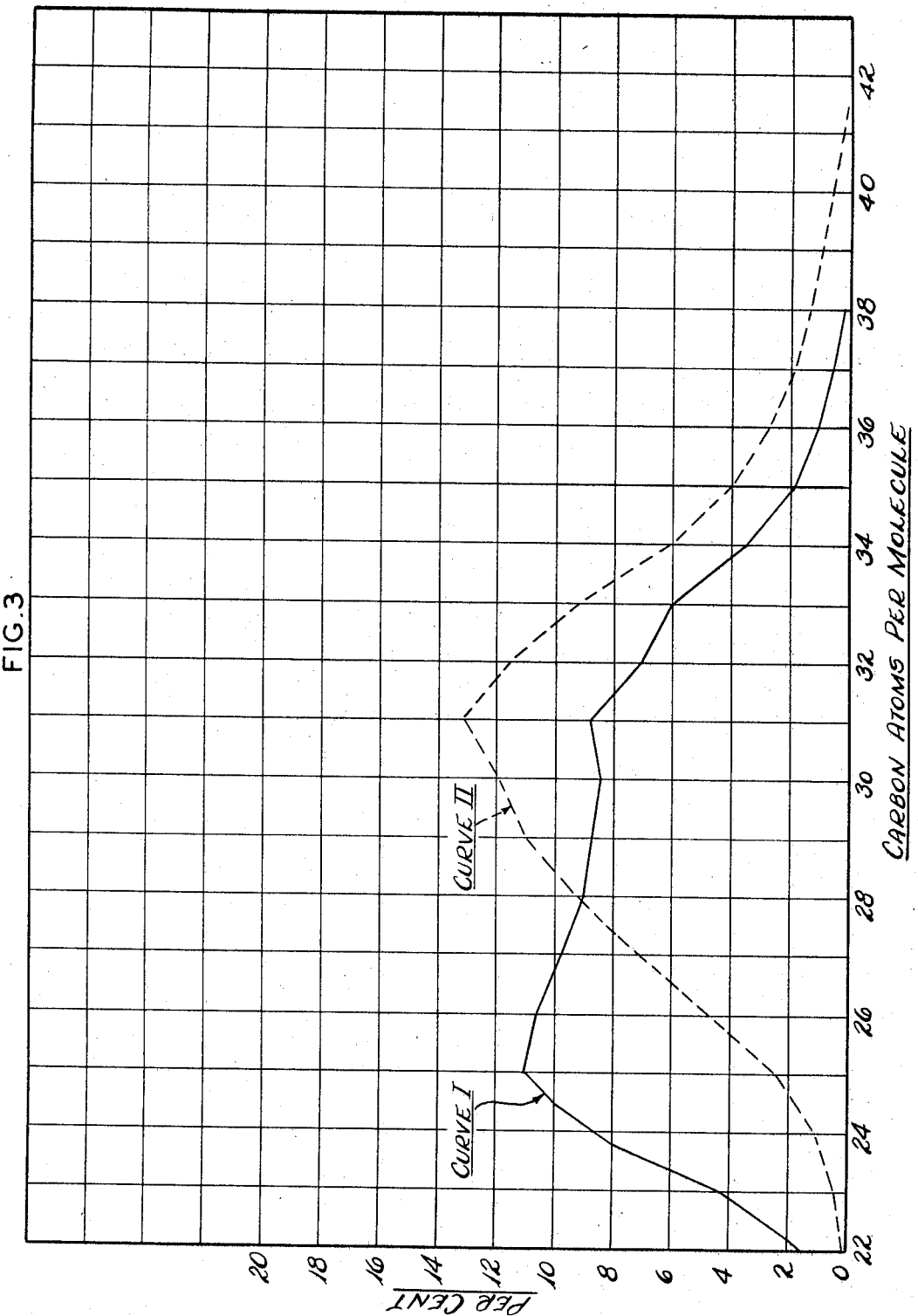

FIGURE 3 gives definite proof that carbon chain length is the controlling factor. The wax of this invention (C of Table I) was incorporated into a rubber stock, the stock cured and the resultant vulcanizate was exposed to various ambient temperatures (30° F. and 80° F.). The bloomed film was removed at each temperature and the carbon atom distribution of said bloom was determined. Curve I represents the 30° F. bloomed film; Curve II represents the 80° F. film. This graph shows the lower carbon atom chains bloom at lower temperatures and the higher carbon atom chains bloom at higher temperatures.

Figure 4:
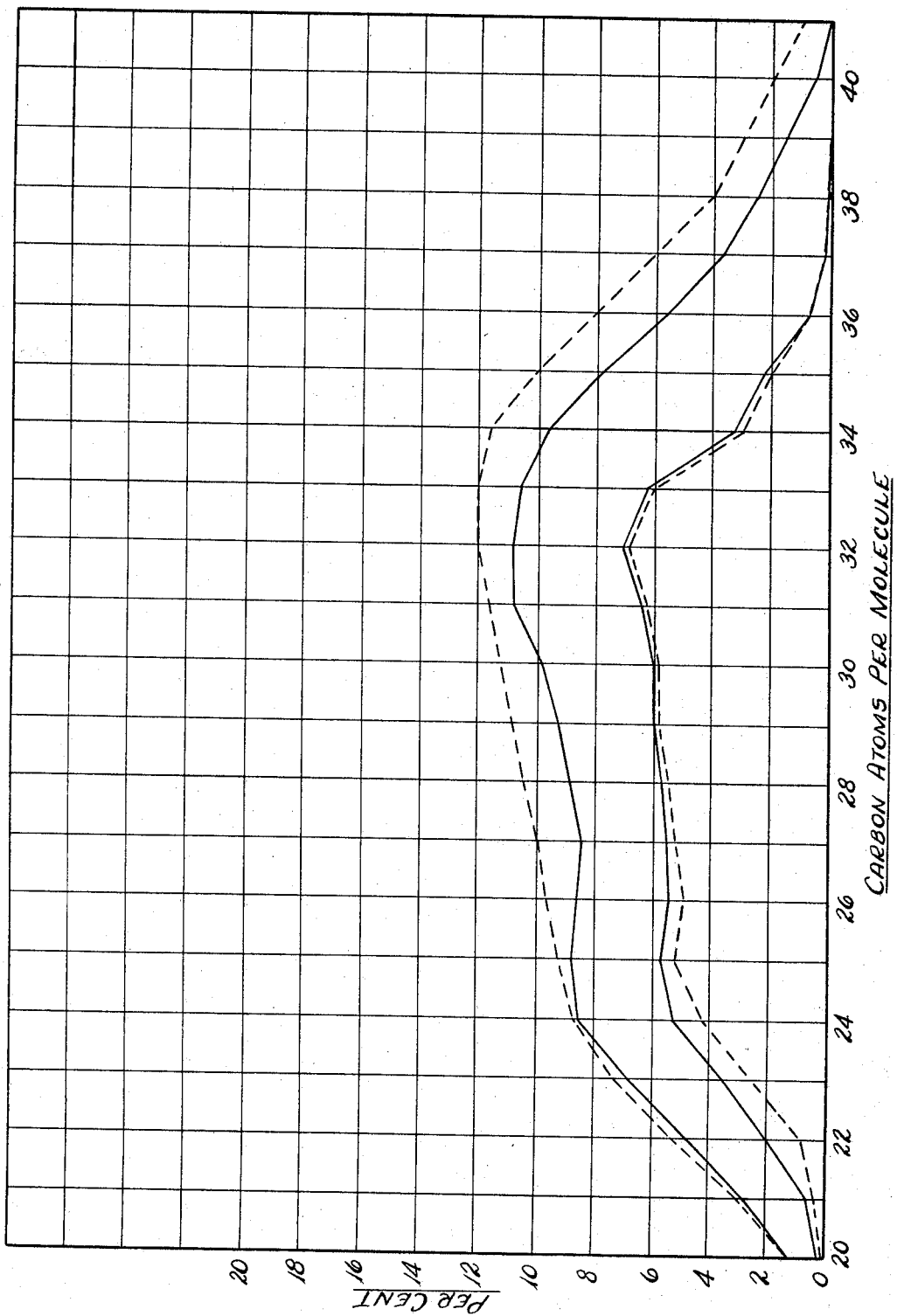

The waxes of this invention may be defined as having a refractive index between 1.423 and 1.429, preferably between 1.425 and 1.427; and a carbon atom distribution within the A limits set forth in Table II, preferably within the narrower B limits set forth in Table II. FIGURE 4 is a graphical representation of the limits in Table II with the area between the broken lines corresponding to wider A limits and within the solid lines to the preferable B limits.

The waxes employed in this invention are all of the N-paraffin type petroleum waxes, but this invention is not limited to this particular type of wax solely. As long as the wax meets the specified carbon atom distribution limits and refractive index limits, its origin is of no significance.

The antiozonants found to be particularly effective when used in combination with the wax of this invention are the hydrocarbon substituted p-phenylenediamines. Specifically the diaryl substituted p-phenylenediamines and hydrocarbon substituted aryl in diaryl substituted p-phenylenediamines; the aryl-alkyl substituted p-phenylenediamines and hydrocarbon substituted aryl, or secondary or tertiary alkyl containing 3 to 19 carbon atoms, or any combination thereof; the dialkyl p-phenylenediamines and secondary or tertiary alkyl containing from 3 to 19 carbon atoms, or any combination thereof; and any combinations thereof. And more specifically N-phenyl-N'-cyclohexyl-p-phenylenediamine, N - phenyl-O-tolyl-p-phenylenediamine, N,N' - di-o-tolyl-p-phenylenediamine, N-phenyl-N'-isopropyl-p-phenylenediamine, N-phenyl-N'-1,3 dimethyl butyl-p-phenylenediamine, N-phenyl-N'-2 octyl-p-phenylenediamine, N,N'-di(1,3 dimethyl, butyl)-p-phenylenediamine, N,N' - di(1,4 dimethyl - pentyl)-p-phenylenediamine, and N,N' - di(1 methyl, heptyl)-p-phenylenediamine.

The rubber articles to which this invention applies may be manufactured of natural rubber or synthetic rubber, that is a polymerization product containing a conjugated diolefin and specifically copolymers of styrene and butadiene, etc. This invention applies to rubber compounds of all colors, white, black, blue, red, etc. and is not limited to rubber compounds used in pneumatic tires but encompasses any vulcanized rubber article. These waxes may be added in any ratio to the rubber hydrocarbon present, preferably the range is 1 to 10 percent based on the rubber hydrocarbon and ideally 3 to 8 parts.

Figure 5:
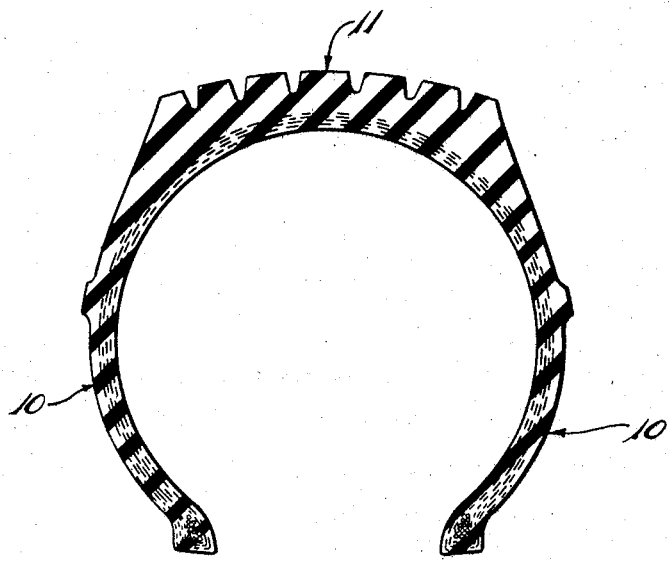
Figure 2:
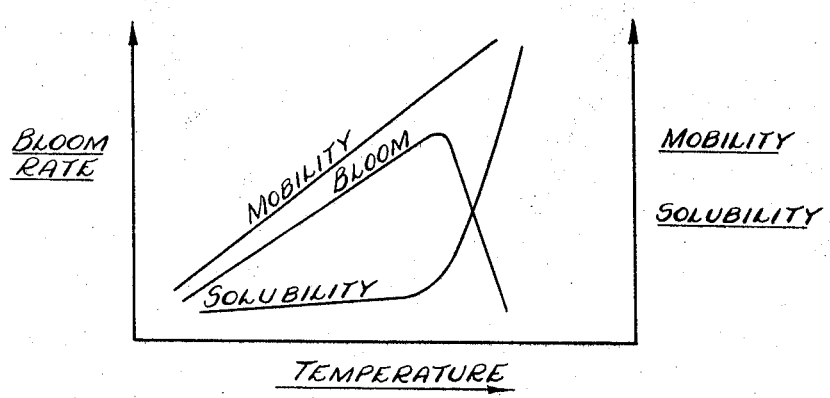

FIGURE 5 represents a tire employing this invention. The invention is employed in the areas of the tire which are exposed to the atmosphere; that is, the sidewalls, 10, and the tread, 11.

The procedure followed to determine the refractive index in defining the wax of this invention is the A.S.T.M. standard procedure D1747–62, part 18, dated January 1965 using 100° C. as the test temperature. The carbon atom distribution is determined by dissolving the wax mixture in benzene and separating its components by gas chromatography. The procedure followed is outlined below:

Conditions

Instrument—F & M Model 720 Dual Column Programmed Temperature Gas
Carrier gas—Chromatograph Helium. Pressure 30# and flow rate adjusted to 140 to 160 ml./min.
Column:
    Sample—2 ft. 20% SE 30 in Diatoport
    Compensating—Same as sample column
Temperature:
    Thermal cond. detector—400° C.
    Injection port—380° C.
    Column temperature—100° C.
Program—10°/min. and hold at 320° C. until 5 minutes after last peak is eluted
Recorder:
    Speed—Set so that 10° C./min.=1 inch
    Attenuation—2X
    Bridge current—150 map

Procedure

Weigh 0.05 to 0.15 gram of sample into a glass vial. By means of a dropper, add benzene to equal about 10 times the weight of wax already present. Stopper with a cork (not with rubber) and warm *slightly* to dissolve wax. With a warmed 50 microliter Hamilton syringe, draw up 30 microliter of sample solution and 5 microliter of $C_{36}$ standard (made in the same ratio as the solution). Inject the total 35 microliter into the chromatograph and complete the analysis.

Calculation

Use any method available for estimating the individual peak areas and relate each individual area to the total, times 100 to give the percent carbon atom distribution of the wax.

It is understood that modification of the present invention may be effected without departing from the novel features of this invention.

TABLE I

| Wax | Melting Point (°C.) | Ambient Temperature | | |
|---|---|---|---|---|
| | | 30° F. | 80° F. | 100° F. |
| A | 127 | None | Bad | Bad. |
| B | 145 | Bad | None | Moderate. |
| C | 145 | None | do | None. |
| D | 155 | Bad | do | Do. |

6.5 parts of wax per 100 RHC incorporated into rubber compound, staticly exposed to 50–60 p.p.h.m. ozone for 24 hours, at indicated ambient temperatures, and resultant cracking of compound recorded.

TABLE II

| Carbon Chain Length | Percent Carbon Atom Distribution Limits | | | |
|---|---|---|---|---|
| | "A" Limits | | "B" (Preferable) Limits | |
| | Low | High | Low | High |
| C16 | 0.0 | 0.5 | 0.0 | 0.3 |
| 17 | 0.0 | 0.5 | 0.0 | 0.3 |
| 18 | 0.0 | 0.5 | 0.0 | 0.3 |
| 19 | 0.0 | 0.6 | 0.0 | 0.6 |
| 20 | 0.1 | 1.2 | 0.1 | 1.2 |
| 1 | 0.3 | 3.0 | 0.6 | 2.8 |
| 2 | 0.8 | 5.2 | 1.9 | 4.0 |
| 3 | 2.6 | 7.2 | 3.5 | 6.8 |
| 4 | 4.2 | 8.6 | 5.2 | 8.5 |
| 5 | 5.2 | 9.1 | 5.6 | 8.7 |
| 6 | 4.9 | 9.5 | 5.4 | 8.6 |
| 7 | 5.2 | 9.8 | 5.4 | 8.4 |
| 8 | 5.4 | 10.4 | 5.6 | 8.8 |
| 9 | 5.8 | 10.8 | 6.0 | 9.2 |
| 30 | 5.8 | 11.2 | 6.0 | 9.8 |
| 1 | 6.2 | 11.6 | 6.4 | 10.8 |
| 2 | 6.8 | 12.0 | 7.0 | 10.8 |
| 3 | 6.0 | 12.0 | 6.2 | 10.6 |
| 4 | 3.0 | 11.6 | 3.2 | 9.6 |
| 5 | 2.0 | 10.0 | 2.2 | 7.8 |
| 6 | 0.8 | 8.0 | 0.8 | 5.6 |
| 7 | 0.2 | 6.0 | 0.2 | 3.8 |
| 8 | 0.1 | 4.0 | 0.1 | 2.6 |
| 9 | 0.0 | 3.0 | 0.0 | 1.0 |
| 40 | 0.0 | 2.0 | 0.0 | .6 |
| 1 | 0.0 | 1.0 | 0.0 | .2 |

We claim:
1. A vulcanizable composition comprising a rubber polymerization porduct, said polymerization product selected from the group consisting of a natural rubber and a synthetic rubber containing a conjugated diolefin, and a petroleum paraffin wax having a refractive index between 1.423 and 1.429, and a carbon atom distribution within the A limits set forth in Table II, said petroleum paraffin wax being present in an amount no less than 1% and no greater than 10% based on the rubber.

2. A vulcanizable composition comprising a rubber polymerization product, said polymerization product selected from the group consisting of a natural rubber and a synthetic rubber containing a conjugated diolefin, and a petroleum paraffin wax having a refractive index between 1.423 and 1.429, and a carbon atom distribution within the B limits set forth in Table II, said petroleum paraffin wax being present in an amount no less than 1% and no greater than 10% based on the rubber.

3. A vulcanizable composition comprising a rubber polymerization product, said polymerization product selected from the group consisting of a natural rubber and a synthetic rubber containing a conjugated diolefin, and a petroleum paraffin wax having a refractive index between 1.425 and 1.427, and a carbon atom distribution within the A limits set forth in Table II, said petroleum paraffin wax being present in an amount no less than 1% and no greater than 10% based on the rubber.

4. A vulcanizable composition comprising a rubber polymerization product, said polymerization product selected from the group consisting of a natural rubber and a synthetic rubber containing a conjugated diolefin, and a petroleum paraffin wax having a refractive index between 1.425 and 1.427, and a carbon atom distribution within the B limits set forth in Table II, said petroleum paraffin wax being present in an amount no less than 1% and no greater than 10% based on the rubber.

5. A vulcanized rubber composition comprising a rubber polymerization product, said polymerization product selected from the group consisting of a natural rubber and a synthetic rubber containing a conjugated diolefin, and a petroleum paraffin wax having a refractive index between 1.423 and 1.429, and a carbon atom distribution within the A limits set forth in Table II, said petroleum paraffin wax being present in an amount no less than 1% and no greater than 10% based on the rubber.

6. A vulcanized rubber composition comprising a rubber polymerization product, said polymerization product selected from the group consisting of a natural rubber and a synthetic rubber containing a conjugated diolefin, and a petroleum paraffin wax having a refractive index between 1.423 and 1.429, and a carbon atom distribution within the B limits set forth in Table II, said petroleum paraffin wax being present in an amount no less than 1% and no greater than 10% based on the rubber.

7. A vulcanized rubber composition comprising a rubber polymerization product, said polymerization product selected from the group consisting of a natural rubber and a synthetic rubber containing a conjugated diolefin, and a petroleum paraffin wax having a refractive index between 1.425 and 1.427, and a carbon atom distribution within the A limits set forth in Table II, said petroleum paraffin wax being present in an amount no less than 1% and no greater than 10% based on the rubber.

8. A vulcanized rubber composition comprising a rubber polymerization product, said polymerization product selected from the group consisting of a natural rubber and a synthetic rubber containing a conjugated diolefin, and a petroleum paraffin wax having a refractive index between 1.425 and 1.427, and a carbon atom distribution within the B limits set forth in Table II, said petroleum paraffin wax being present in an amount no less than 1% and no greater than 10% based on the rubber.

9. A tire comprised of a vulcanized rubber composition, said vulcanized rubber composition being comprised of a rubber polymerization product, said polymerization product selected from the group consisting of a natural rubber and a synthetic rubber containing a conjugated diolefin, and a petroleum paraffin wax having a refractive index between 1.423 and 1.429, and a carbon atom distribution within the A limits set forth in Table II, said petroleum paraffin wax being present in an amount no less than 1% and no greater than 10% based on the rubber.

10. A tire comprised of a vulcanized rubber composition, said vulcanized rubber composition being comprised of a rubber polymerization product, said polymerization product selected from the group consisting of a natural rubber and a synthetic rubber containing a conjugated diolefin, and a petroleum paraffin wax having a refractive index between 1.423 and 1.429, and a carbon atom distribution within the B limits set forth in Table II, said petroleum paraffin wax being present in an amount no less than 1% and no greater than 10% based on the rubber.

11. A tire comprised of a vulcanized rubber composition, said vulcanized rubber composition being comprised of a rubber polymerization product, said polymerization product selected from the group consisting of a natural rubber and a synthetic rubber containing a conjugated diolefin, and a petroleum paraffin wax having a refractive index between 1.425 and 1.429, and a carbon atom distribution within the A limits set forth in Table II, said petroleum paraffin wax being present in an amount no less than 1% and no greater than 10% based on the rubber.

12. A tire comprised of a vulcanized rubber composition, said vulcanized rubber composition being comprised of a rubber polymerization product, said polymerization product selected from the group consisting of a natural rubber and a synthetic rubber containing a conjugated diolefin, and a petroleum paraffin wax having a refractive index between 1.425 and 1.429, and a carbon atom distribution within the B limits set forth in Table II, said petroleum paraffin wax being present in an amount no less than 1% and no greater than 10% based on the rubber.

References Cited

UNITED STATES PATENTS

| | | | |
|---|---|---|---|
| 2,345,717 | 4/1944 | Turner | 260—28.5 |
| 2,756,217 | 7/1956 | Young | 260—28.5 |
| 1,979,946 | 11/1934 | Krauch | 260—28.5 |
| 1,832,964 | 11/1931 | Bradley | 260—799 |
| 2,705,224 | 3/1955 | Hill | 260—28.5 |
| 3,112,285 | 11/1963 | Phelan | 260—28.5 |
| 3,304,285 | 10/1960 | Cox | 260—28.5 |
| 2,662,864 | 12/1953 | Rumberger | 260—28.5 |
| 2,692,000 | 10/1954 | Peterson | 260—28.5 |
| 2,534,883 | 12/1950 | Smyers | 260—28.5 |
| 2,013,319 | 9/1935 | Semon. | |

OTHER REFERENCES

Warth: "The Chemistry of Waxes, 1956, p. 883 (2nd edition), Reinhold Pub. Co.

MORRIS LIEBMAN, *Primary Examiner.*

H. H. FLETCHER, *Assistant Examiner.*

UNITED STATES PATENT OFFICE
CERTIFICATE OF CORRECTION

Patent No. 3,423,348  January 21, 1969

Edmund Gerald Eigenfeld et al.

It is certified that error appears in the above identified patent and that said Letters Patent are hereby corrected as shown below:

Column 5, TABLE I, heading to the second column, line 2 thereof, "C" should read -- F --. Column 6, line 3, "porduct" should read -- product --. Column 7, line 26 and column 8, line 5, "1.429", each occurrence, should read -- 1.427 --.

Signed and sealed this 24th day of March 1970.

(SEAL)
Attest:

Edward M. Fletcher, Jr.  WILLIAM E. SCHUYLER, JR.

Attesting Officer  Commissioner of Patents